May 17, 1938.  A. MAURER  2,117,340

STEPLESS CHANGE GEAR

Filed May 29, 1936  2 Sheets-Sheet 1

Inventor
Albrecht Maurer
by Parker &
Carter.
Attorneys.

Patented May 17, 1938

2,117,340

UNITED STATES PATENT OFFICE 2,117,340

STEPLESS CHANGE GEAR

Albrecht Maurer, Bad Homburg v. d. Hohe, Germany, assignor to Firm P. I. V. Ketten und Getriebe G. m. b. H., Bad Homburg v. d. Hohe, Germany, a corporation of Germany Application May 29, 1936, Serial No. 82,415
In Germany June 3, 1935

4 Claims. (Cl. 74—286)

This invention relates to continuously variable change speed gears comprising a compensating gearing, including a planet system which is connected with the driving shaft. The device of the invention includes two sun wheels so arranged that both sun wheels are driven at variable speeds. Particularly the two sun wheels can be driven in opposite directions. Thus, it is possible to regulate the speed of the driving shaft absolutely symmetrically in both directions of rotation and to carry out this regulation with very great accuracy especially near the stopping position.

The two sun wheels can each be driven by a shaft of a stepless change gear. For example a chain gear with two adjustable pairs of conical discs and chain links running therebetween may be used as such a stepless change gear. If the driving motor only drives one of the shafts of the change gear, then during the adjustment from the maximum speed in one direction to the maximum speed in the other direction the turning moment on the driving shaft of the gear changes corresponding to the varying diameter of the circular path of the chain in proportion to the root of the regulating range of the gear. This objection can be overcome by driving the two shafts of the change gear simultaneously from a common source of power through the intermediary of a compensating gear This presents the further advantage that it is possible to transmit about double the efficiency than that which is possible when driving only one shaft without altering the size of the change speed gear and that the driving speed in both directions of rotation is regulated absolutely symmetrically to the zero position of the regulating element.

As will be understood from the drawings, the device of the present invention comprises a change-speed gear characterized by the fact that the output drive shafts are driven through a differential gear, the sun wheels of which are driven with variable speeds, and the sun wheels of the differential gear are each driven by one of the shafts of the continuously variable change-speed gear, which shafts are in turn simultaneously driven by a common source of power through a second differential gear.

While many forms of change-speed gearing may be used, one suitable form which is illustrated herewith comprises two adjustable pairs of conical discs with a drive element such as a chain link belt running between them.

In the particular form of the device shown herewith a connection between the two power branches of the transmission is provided which controls the speed of revolution of the two branches and in this manner a different speed of rotation of the power take-off shaft is always insured. It is possible on the one hand to regulate the speed of the power take-off shaft through zero symmetrically on both sides of adjustment by means of the continuously variable regulating gear which may be a speed range on one side, for instance of 1:4. The power which can be transmitted at extreme speeds of rotation is approximately twice as great as that which could be transmitted with the same load on the regulating gear where only a single differential gear is used. For this reason the structure of the present invention embodies the two differential gears shown and described in greater detail below.

On the other hand the device of the present invention permits regulation from zero to a maximum speed of rotation. The power at the power take-off or output drive shaft for maximum speed of rotation is approximately one and one-half times the power transmitted in the actual regulating gear, which in turn is exactly double that transmitted by regulating gears heretofore known having only a single differential at the highest speed of rotation. The device of the present invention, therefore, permits a substantial reduction in the size of the regulating gear necessary for a predetermined maximum power output or, conversely, permits of a considerably greater power output being transmitted with a given regulating gear.

The invention is diagrammatically illustrated in the accompanying drawings in which:—

Figure 1:
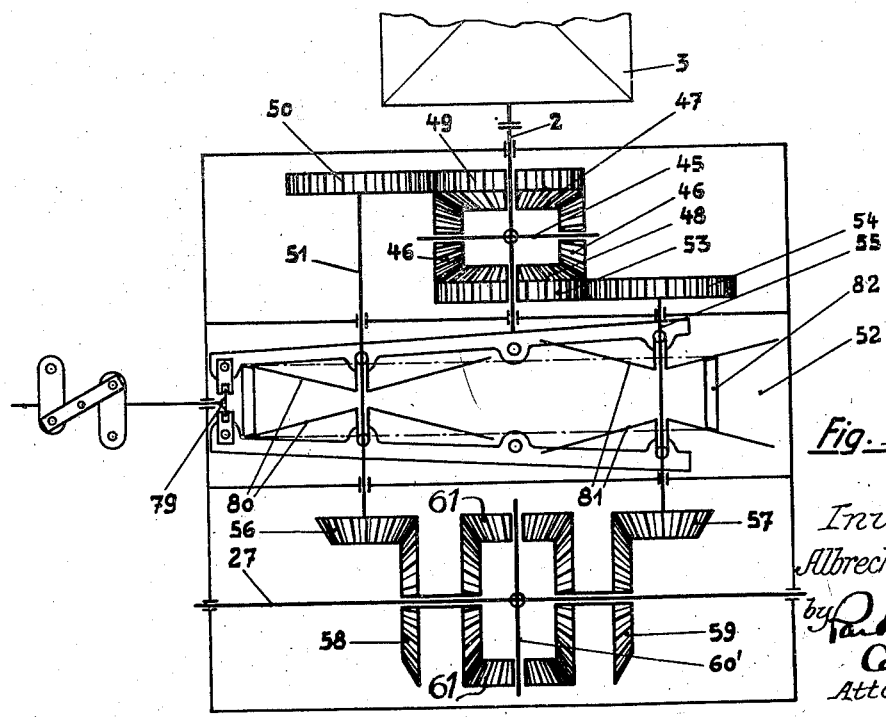
Fig. 1 is a diagrammatic view showing the form of construction.

Referring to Figure 1, a motor 3 drives the planet wheel carrier 45 of a differential gear. The planet wheels 46 on the planet wheel carrier mesh with two sun wheels 47 and 48 which are loosely mounted on the driving shaft 2 of the motor. The sun wheel 47 drives by a ring of teeth 49 a toothed wheel 50 which is keyed on a shaft 51 of a variable speed chain belt gear 52 comprising two pairs of cone discs 80 and 81 and a driving chain belt 82. The sun wheel 48 drives through a ring of teeth 53 a toothed wheel 54 keyed on a second shaft 55 of the variable speed gear 52. The two shafts 51 and 55 drive through bevel wheels 56 and 57 the two sun wheels 58 and 59 of another differential gear, the planet wheels 61 of which are mounted on a spindle 60' keyed on shaft 27. The sum of the numbers of revolutions of the two shafts 51 and 55 is determined by the running speed of the motor 3. On the other hand, by adjusting the variable speed gear 52 by means of a regulating device 79, the ratio of the numbers of revolutions of the shafts 51 and 55 can be changed so that the drive output shaft 27 can be adjusted to any speed in both directions of rotation.

Figure 2:
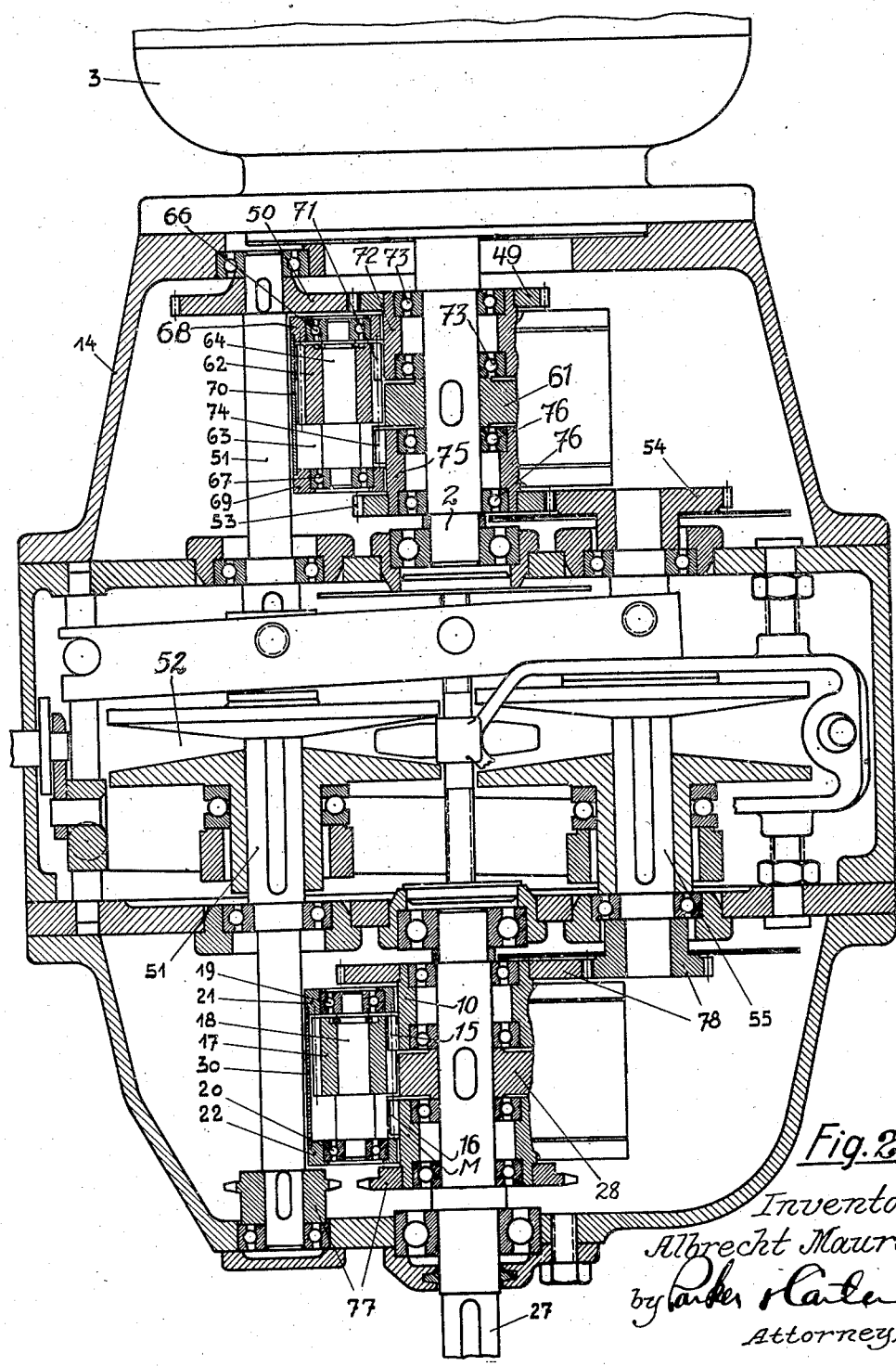
Fig. 2 is a longitudinal section through such a gear, only the two shafts of the known stepless change conical disc gear are shown.

In the form of construction shown in longitudinal section in Figure 2, the electric motor 3 is fixed on the gear casing 14. On the shaft 2 of this motor a disc 61 is keyed which forms part of the planet wheel carrier of a differential gear, the planet wheels of which are toothed wheels, the shafts of which run in ball bearings 66 and 67 in ring discs 68 and 69. The ring discs are connected by a cylindrical wall 70 with the disc 61 which has arms 63 extending outwardly between the planet wheels. The planet wheels 62 mounted on shafts 64 mesh with a ring of teeth 71 mounted on a hub 72 which runs in ball bearings 73 on the shaft 2. The hub 72 carries a toothed wheel 49 which drives a change speed gear 52 through the intermediary of a toothed wheel 50 on one of the shafts 51. Correspondingly a second set of planet wheels (not shown) mesh with a ring of teeth 74 on a hub 75 which runs in ball bearings 76 on the shaft 2. The hub 75 carries a toothed wheel 53 which drives the second shaft 55 of the change speed gear 52 through a toothed wheel 54.

The two sun wheels of a second differential gear are driven by the shafts 51 and 55, this gear corresponding in its construction and operation to the differential gear which connects the shaft 2 to the shafts 51 and 55, and the planet wheel carrier is connected with the output drive shaft 27. The shaft 51 drives the one sun wheel 11 having a ring of teeth 16 in the same direction by means of a chain belt drive 77, whereas the shaft 55 drives the other sun wheel 10 having the ring of teeth 15 in the opposite direction by means of a toothed wheel drive 78. The ring of teeth 15 meshes with toothed planet wheels 17, the shafts 18 of which are journalled by means of ball bearings 19 and 20 in two rings discs 21 and 22. In a similar manner the ring of teeth 16 meshes with other planet wheels (not shown) the shafts of which are also journalled in the two ring discs 21 and 22 and each of which also meshes with one of the planet wheels 17.

Having now particularly described and ascertained the nature of the said invention and in what manner the same is to be performed, I declare that what I claim is:—

1. A stepless change gear, comprising in combination a compensating sun and planet wheel gear, a driving shaft connected to the planet system of said gear, a stepless variable gear having two shafts, each shaft adapted to drive one of the two sun wheels of said gear, a compensating gear connected with both said last mentioned shafts and a common source of power adapted to drive both of said last mentioned shafts through the intermediary of said compensating gear.

2. A continuously variable change speed gear including a power source, an output shaft, a differential gear interposed between the two, a planetary gear system having sun wheels, means for driving said sun wheels at variable speeds by said driving means, the change speed gear characterized by the fact that the two sun wheels of the differential gear are each driven by one of the shafts of a continuously variable change speed regulating gear, and that said shafts are in turn simultaneously driven by a common source of power through a second differential gear.

3. A continuously variable change speed gear, including a power source, a power output shaft, a continuously variable change speed gearing interposed between the two and comprising pairs of conical discs mounted on shafts to be moved toward and from each other, and a flexible driving element in contact with said discs, a differential gear interposed between said power source and said change speed gearing, a second differential interposed between said change speed gearing and said power output shaft, said differential gears including sun wheels, the mechanism characterized by the fact that the two sun wheels of the differential gear are each driven by a separate moving part of the continuously variable change speed gearing, which parts are in turn simultaneously driven by the common power source through one of the differential gears.

4. A continuously variable change speed gear, including a power source, a power output shaft, a continuously variable change speed gearing interposed between the two and comprising pairs of conical discs mounted on shafts to be moved toward and from each other, and a flexible driving element in contact with said discs, a differential gear interposed between said power source and said change speed gearing, a second differential interposed between said change speed gearing and said power output shaft, said differential gears including sun wheels, the mechanism characterized by the fact that the two sun wheels of the differential gear are each driven by a separate shaft of the continuously variable change speed gearing, which shafts are in turn simultaneously driven by the common power source through one of the differential gears.

ALBRECHT MAURER.